US006823317B1

(12) United States Patent
Ouimet et al.

(10) Patent No.: US 6,823,317 B1
(45) Date of Patent: Nov. 23, 2004

(54) URBAN PARKING SYSTEM

(75) Inventors: Luc Ouimet, Laval (CA); Nikolaos Leoutsarakos, Brossard (CA)

(73) Assignee: Axxian Technologies INC, Brossard (CA)

( * ) Notice: Subject to any disclaimer, the term of this patent is extended or adjusted under 35 U.S.C. 154(b) by 0 days.

(21) Appl. No.: 08/961,553

(22) Filed: Oct. 30, 1997

Related U.S. Application Data

(63) Continuation of application No. PCT/CA97/00206, filed on Apr. 1, 1997.
(60) Provisional application No. 60/014,531, filed on Apr. 2, 1996.

(51) Int. Cl.[7] .................................... G06F 17/60
(52) U.S. Cl. .................................... 705/13
(58) Field of Search .................................... 705/13

(56) References Cited

U.S. PATENT DOCUMENTS 4,310,890 A 1/1982 Trehn et al.
4,379,334 A 4/1983 Feagins, Jr. et al.
4,460,965 A 7/1984 Trehn et al.
4,500,880 A 2/1985 Gomersall et al.
4,555,618 A 11/1985 Riskin
4,777,354 A * 10/1988 Thomas
4,812,805 A * 3/1989 Lachat et al.
4,828,406 A * 5/1989 Mosciatti et al. ............. 400/23
4,861,971 A * 8/1989 Chan .......................... 235/384
4,872,149 A 10/1989 Speas
4,876,540 A * 10/1989 Berthon et al.
4,888,709 A 12/1989 Revesz et al.
4,937,586 A * 6/1990 Stevens et al.
5,003,520 A 3/1991 Grieu et al.
5,019,811 A 5/1991 Olsson et al.
5,029,094 A 7/1991 Wong
5,103,957 A * 4/1992 Ng et al. .................... 194/217
5,150,116 A 9/1992 West
5,166,680 A * 11/1992 Ganot (List continued on next page.)

FOREIGN PATENT DOCUMENTS

FR 2 600 448 12/1987
GB 2284290 * 7/1991
GB 2 274 523 7/1994
GB 2 284 290 5/1995
JP 6-68395 6/1991
WO 93/20539 * 10/1993
WO WO 94/07206 3/1994

OTHER PUBLICATIONS

Wirtschafter, Jacob. "TA Workers Fired for Fixing Parking Tickets," Jerusalem Post, Jul. 9, 1992 [Proquest].*
Grossman, Elliot. "SEIU Files Grievance Over Parking Issue," Morning Call, Dec. 7, 1993 [Proquest].*
"The long arm of the law," Forbes, Mar. 11, 1985 [Dialog].*
Meislin, Richard. "Ticket Computer Proving Successful," New York Times Jan. 23, 1986 [Dialog].*

(List continued on next page.)

*Primary Examiner*—Tariq R. Hafiz
*Assistant Examiner*—Catherine M. Colón
(74) *Attorney, Agent, or Firm*—Ogilvy Renault; C. Marc Benolt

(57) ABSTRACT

A wireless network covering a large local geographic area is used to link a large number of payment terminals provided in the same area. Each payment terminal is located near a plurality of parking spaces, either at the curbside or in municipal lots. Parking data is gathered from motorists at the payment terminals, the parking data including vehicle identification data or parking space identification data. The parking data is sent from the payment terminals to the wireless network in response to payment made at the payment terminals. A plurality of portable terminals are provided for use by parking wardens inspecting the parking spaces of the local geographic area. The wireless network is used to transmit the parking data substantially upon receipt from the payment terminals to the portable terminals in the local geographic area.

15 Claims, 4 Drawing Sheets

U.S. PATENT DOCUMENTS

| | | | | | |
|---|---|---|---|---|---|
| 5,266,947 | A | | 11/1993 | Fujiwara et al. | |
| 5,309,414 | A | | 5/1994 | Chiu | |
| 5,339,000 | A | | 8/1994 | Bashan et al. | |
| 5,408,078 | A | | 4/1995 | Campo et al. | |
| 5,414,624 | A | | 5/1995 | Anthonyson | |
| 5,442,348 | A | * | 8/1995 | Mushell | |
| 5,465,085 | A | | 11/1995 | Caldwell et al. | |
| 5,552,776 | A | * | 9/1996 | Wade et al. | 340/5.74 |
| 5,646,853 | A | * | 7/1997 | Takahashi et al. | 340/911 |
| 5,648,906 | A | * | 7/1997 | Amirpanahi | 705/418 |
| 5,726,885 | A | * | 3/1998 | Klein et al. | 235/384 |
| 5,740,050 | A | * | 4/1998 | Ward, II | 340/932.2 |
| 5,845,268 | A | * | 12/1998 | Moore | 340/932.2 |
| 6,317,721 | B1 | * | 11/2001 | Hurta et al. | 235/384 |
| 6,418,326 | B1 | * | 7/2002 | Heinonen et al. | 455/558 |

OTHER PUBLICATIONS

Wells, Janet. "Berkeley's Parking Meters Will Extend 5–Minute Grace Period," San Francisco Chronicle. Sep. 29, 1994.*
"New Parking, Traffic Fines System is Now in Operation," Jerusalem Post. Jul. 5, 1990.*
Freed, David. "L.A. Plans to Grant Working Press Break on Some Parking Ordinances," The Los Angeles Times. Dec. 18, 1986.*
Green, Larry. "Tickets Worth Tens of Millions Chicago in a Jam in Effort to Collect Parking Fines," The Los Angeles Times. Dec. 31, 1988.*
Lacey, Marc. "Unpaid Parking Fines May Have Cost L.A. $500,000 Audit . . . " The Los Angeles Times. Sep. 23, 1993.*
Grossman, Elliot. "Police Official Ignores Tickets in Front of Home," Morning Call. Nov. 20, 1993.*
Rohrbough, Linda. "Lockheed/AT&T will offer computer svcs to motorists," Newsbyte. Apr. 13, 1992.*
Brochure "Parking Meter Housing, Model 70 Single", by Duncan, Harrison, Arkansas 72601, USA.
Brochure "Falcon Pay and Display/Multi–Space", by Harrison, Arkansas 72601, USA.
Brochure "Stelio The Pay & Display Terminal to Enhance your Parking Strategy" by Schlumberger Electronic Transactions.
Brochure "Pay & Display Machine" by Amper Ciudad.
Brochure "Another milestone with integrated solarpanel" By Dambach–Werke GmbH, Gaggenay, Germany.
Brochure "MS SITY XSIXL", The New Generation of pay and display machines, by Siemens—Germany.
Brochure "Introducing POM's New APM–2X and APM–4X, Meter System", By Pom, Russellville, AR 72801, USA.
Brochure "Pay and Display machine PRISMA" by Siemsens.
Brochure "Ultimate solution for on–street parking, Pay & Display in conbination with the versatility of the CAR–D–PARK", By Amano.
Brochure "Control space and time" by CSI Parking Systems Inc.
Brochure Concept HITPARC by CGA, pp. 16–17.
Brochure "Radio–Park" by Schick Electronic SA. Switzerland.
Brochure "A new Generation in Parking" by Natan Tomer Engineering–Tel Aviv, Israel.
Brochure "Autoparq" by Duncan, Harrison, Arkansas 72601, USA,.
Brochure "Smart Park", by Forum Technology Corporation. Tenafly, N' J' 97670, USA.
Brochure "PIAF, Your personal smart card parking meter" by Innovatron Systèmes Urbains, Cavaillon, France.
Brochure "PCARD, in–card electronic parking meter" by Tactel Ltd, a subsidiary of Tadiran.
Brochure Reino "The world most advanced parking meter" by Reinhardt, Chatswood NSW 2067, Australia.
Brochure "Cash & Card".
Brochure "MP 104", by Cale.
Brochure "Horosage Product Line", by Sagem S.A.
Brochure "Pay & Display/Pay–by–Stall", By Digital Pioneer Technology Corporation, Edmonton, Alta, Canada.
Brochure "Norbill 2000" by Nortronic AS, Stavanger, Norway.
Brochure "The Mackay Guardian", by J.J. MacKay Canada Ltd., New Glasgow, N.S.
Brochure The park–Ur–Self System IV, by the Park–Ur–Self System Inc., Novato, CA 94949, USA.
Brochure "Vision pay and display" from Alfia Services Ltd., Bristol BS15 4PQ, England.
Brochure "Parking Vending Machine" by Nagler Metal Technik, 92706 Luhe–Wildenau, Germany.
Brochure "Micropark Ticket Vendor", by PM Controls Ltd., Stockport, England.
Brochure "The Ultimate for Revenue Collection and Control", by Metric Parking England GL7 1YG.
Brochure "Flexipark 3000" by Wellman West Yorkshire, England HX2 6JB.
Brochure "Tech P Park" TP–1000, Baltvagen 17A, S–191 43 Sollentuna, Switzerland.
Brochure "ParkSmart Network", , by MeterVision, USA.
Brochure "International Parking Systems" by International Parking Systems, Inc. Florida 32903–3386, USA.

* cited by examiner

URBAN PARKING SYSTEM

This application is a continuation of PCT/CA97/00206 filed Apr. 1, 1997 designating the United States and claiming priority of U.S. provisional patent application serial No. 60/014,531 filed Apr. 2, 1996.

FIELD OF THE INVENTION

The present invention relates to an urban parking system. More specifically, the present invention relates to an urban parking system in which a wireless network is utilized to communicate vehicle parking status information from a payment terminal to portable checking terminals.

BACKGROUND OF THE INVENTION

In the present urban parking systems in use in North America, parking is paid for on most urban streets and many city lots by inserting coins into a parking meter assigned to each parking space. A parking warden or checker periodically checks each parking meter and each corresponding parking space to determine if a citation should be written up.

For the motorist, the convenience of being able to pay at the curb and then be on one's way is of great importance.

It is known in the art from U.S. Pat. No. 4,812,805 to LaChat et al. and U.S. Pat. No. 4,876,540 to Berthon et al. to provide portable terminals which receive vehicle parking status data pairs (i.e. vehicle ID number and expiration time) from curbside payment terminals, and to provide a low energy consumption data communication system among the payment terminals. Such an electronic urban parking system is able to comply with the basic requirements for an efficient system, namely, the motorists may pay at a curbside payment terminal and may then be free to go without returning to their vehicle to place a proof of payment instrument, and the portable terminals may be provided with sufficiently accurate data to determine with reasonable accuracy whether a vehicle's parking is paid for.

However, in larger urban areas, Applicants have determined that a large number of payment terminals are required for motorists' convenience, especially when harsh climate conditions of cold, heat and precipitation are common. Motorists may, for convenience, wish to pay for parking indoors or at a payment terminal not immediately associated with the parking space occupied. Since payment may take place far away from the parking space, it is no longer sufficient for a parking warden to acquire local information from neighboring curbside payment terminals. For these reasons, it is desirable to make large areas, such as entire business districts, into individual parking zones and permit payment of parking from any terminal in the zone, or even from outside the zone. To accommodate such marketing, a large number of payment terminals needs to provide data to a large number of portable terminals and at longer distances.

Under such circumstances, the amount of vehicle data received from the payment terminals and transferred to portable checking terminals requires special consideration for efficient handling. It has been determined that the known handling of parking data, i.e. either transmission from the payment terminal periodically to an individual portable terminal or transmission from the payment terminal upon request to the requesting portable terminal, cannot efficiently handle the required large amount of data transfer when a large number of payment terminals are used and when parking zones encompass a number of payment terminals. In addition, data transferred locally from a payment terminal to portable terminals periodically and upon request is neither complete nor up to date when motorists are allowed to park anywhere within a zone including many payment terminals.

SUMMARY OF THE INVENTION

It is an object of the present invention to provide an urban parking system of the type having curbside payment terminals and portable electronic wireless terminals in which data relating to parking payment is efficiently handled.

It is a further object of the present invention to make use of a public wireless network in such an urban parking system.

It is yet another object of the present invention to provide an urban parking system of the type having curbside payment terminals and portable electronic wireless terminals in which, in response payment made at one of the payment terminals, data is automatically transmitted concerning the payment made to all portable terminals by wireless means.

It is a further object of the invention to provide an urban parking system of the type having curbside payment terminals, a central control system connected to a wireless transmitter and portable electronic wireless terminals, which cooperate in unison to handle data relating to parking payment efficiently.

According to the invention, there is provided an urban parking system comprising: a wireless network covering a large local geographic area; a large number of payment terminals provided in the geographic area each located near a plurality of parking spaces, each payment terminal comprising data collection means for gathering parking data from a motorist, the parking data including at least one of vehicle identification data and parking space identification data; communication means for transferring the parking data from the data collection means to the wireless network in response to payment made at the payment terminals; a plurality of portable terminals for use by parking wardens inspecting the parking spaces of the geographic area, the portable terminals including wireless communication means, a memory for storing the parking data, and a user interface means; and broadcast means associated with the wireless network for transmitting the parking data substantially upon receipt from the communication means to the portable terminals in the geographic area.

The invention also provides a method of communicating vehicle parking data in an urban parking system, the method comprising the steps of: providing a wireless network covering a large local geographic area; providing a large number of payment terminals provided in the local geographic area each located near a plurality of parking spaces; gathering parking data from motorists at the payment terminals, the parking data including at least one of vehicle identification data and parking space identification data; transferring the parking data from the payment terminals to the wireless network in response to payment made at the payment terminals; providing a plurality of portable terminals for use by parking wardens inspecting the parking spaces of the local geographic area; and using the wireless network to transmit the parking data substantially upon receipt from the payment terminals to the portable terminals in the local geographic area.

BRIEF DESCRIPTION OF THE DRAWINGS

The invention will be better understood by way of the following description of a preferred embodiment of the invention with reference to the appended drawings, in which.

DETAILED DESCRIPTION OF THE PREFERRED EMBODIMENT

Figure 1:
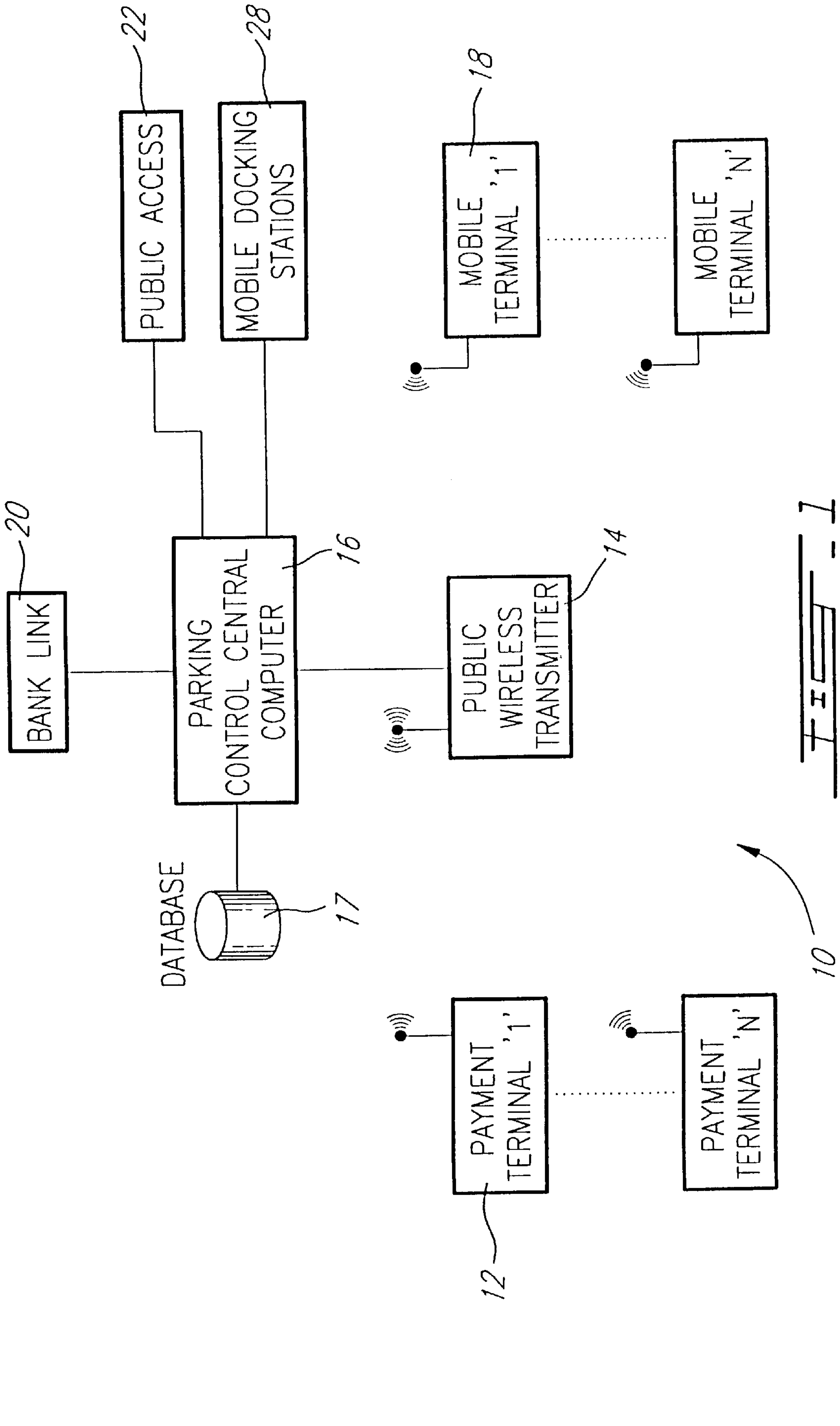
FIG. 1 is a schematic block diagram of the urban parking system according to the preferred embodiment.

As shown in FIG. 1, the urban parking system 10 according to the preferred embodiment has a large number of payment terminals 12 schematically illustrated as being numbered from 1 through N. The payment terminals 12 include wireless communication means for communicating bidirectionally with a public wireless transmitter 14 of a public wireless network. The wireless network in the preferred embodiment is a packet data wireless network, and in particular in North America this may be an ARDIS network.

The parking system 10 has a central control computer 16, which in the preferred embodiment is a network of computers, for recording parking data in a database 17. The parking data is broadcast from transmitter 14 to a number of mobile terminals 18 used by parking wardens. The terminals 18 are illustrated as being numbered from 1 through N. In the preferred embodiment, a payment terminal 12 sends parking data for each vehicle parked to all mobile terminals by sending a packet to a group address shared by the mobile terminals 18 as well as the central computer 16. In this way, the payment terminal 12 controls the flow of data to the mobile terminals 18 and the central computer has no control over directing data transmission. For security purposes, the parking data is encrypted before transmission.

The central computer 16 also processes other transactions, such as credit card and bank card purchases handled via a bank link or gateway 20. The public can inquire about parking status and citation status by a public access computer equipped with Internet capability and/or with DTMF responsive automated voice communications. The mobile terminals 18 have docking stations 28 for recharging batteries and for providing a continued wired link between the parking data being received by computer 16 and the mobile terminals 18.

Figure 2:
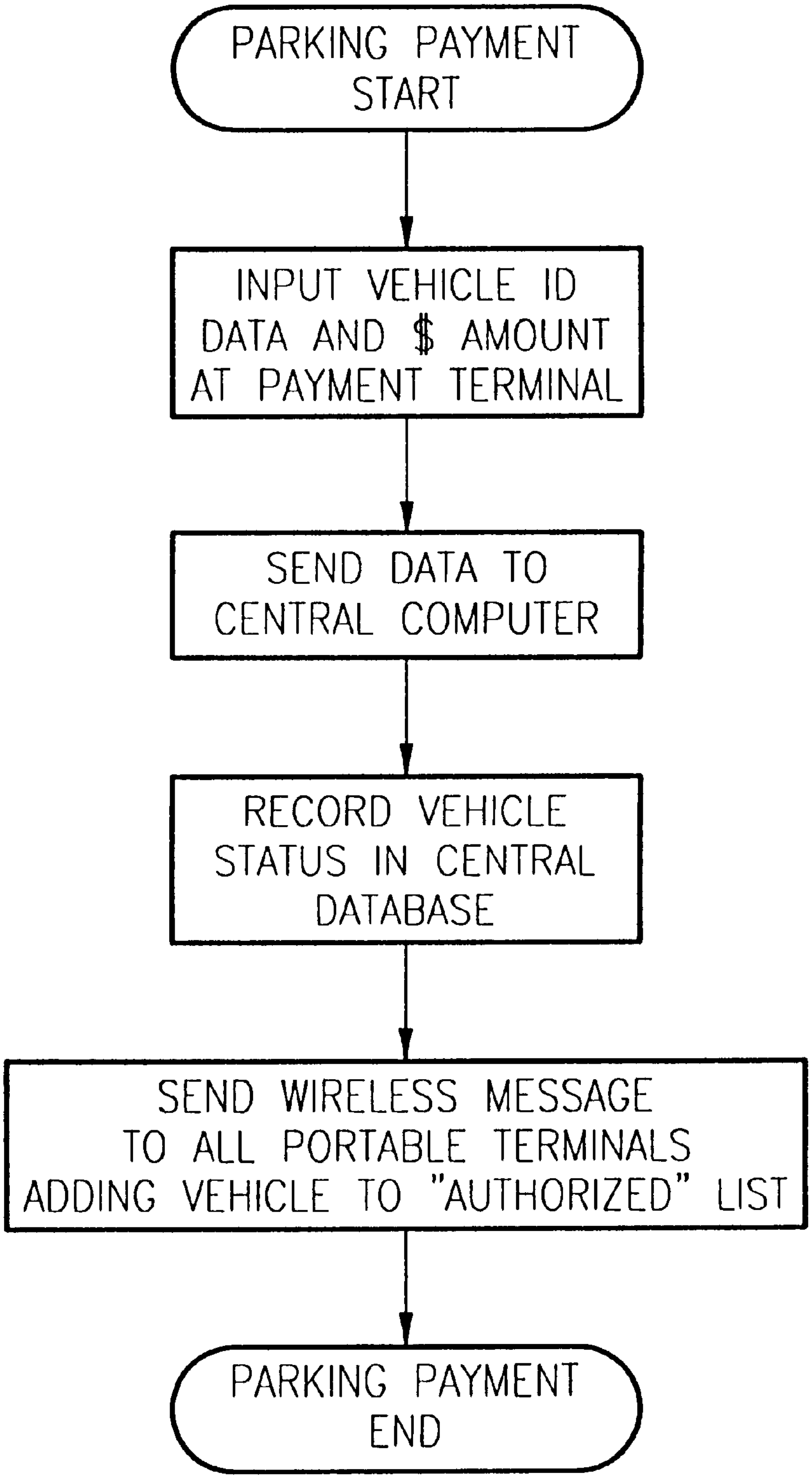
FIG. 2 is a basic flow chart illustrating the steps carried out during a parking payment in the system according to the preferred embodiment.

As illustrated in FIG. 2, the method according to the preferred embodiment can be described as follows. For each payment for parking, a motorist goes to a payment terminal and enters vehicle identification data and either (a) a desired parking duration, (b) a desired parking end time, or (c) a desired amount of money to be paid. The vehicle identification data may be stored on a motorist's smart card or on a magnetic stripe card accepted by the terminal, in which case entering of the data each time a motorist parks is not required. The payment terminal accepts the data and the funds either by use of a coin or bill acceptor or by electronic payment. Electronic payment may be in the form of a credit or debit transaction, or electronic funds recorded on the smart card or the mag stripe card. In the case of a credit or debit transaction, the payment terminal may communicate with a financial institution transaction processing host to confirm the availability and transfer of funds. Such additional communication is shown in the steps of FIG. 2. The payment terminal then sends a data packet including the parking data with a group address so that the central computer and all portable terminals receive the parking data. This is shown in FIG. 2 as two separate transmissions because, in the preferred embodiment, the payment terminal first transmits the parking data to the public wireless transmitter, which in turn relays the packet data to the central computer by land network for recording the vehicle status data in the central database and to all mobile terminals over the air waves. At this point, all mobiles and the central database have received the parking data created by the parking time purchase carried out at the parking payment terminal. If a mobile terminal does not acknowledge receipt of a packet, the packet is resent automatically by the public wireless transmitter. In the preferred embodiment, resent packets are sent by individual addressing instead of a group address.

Figure 3:
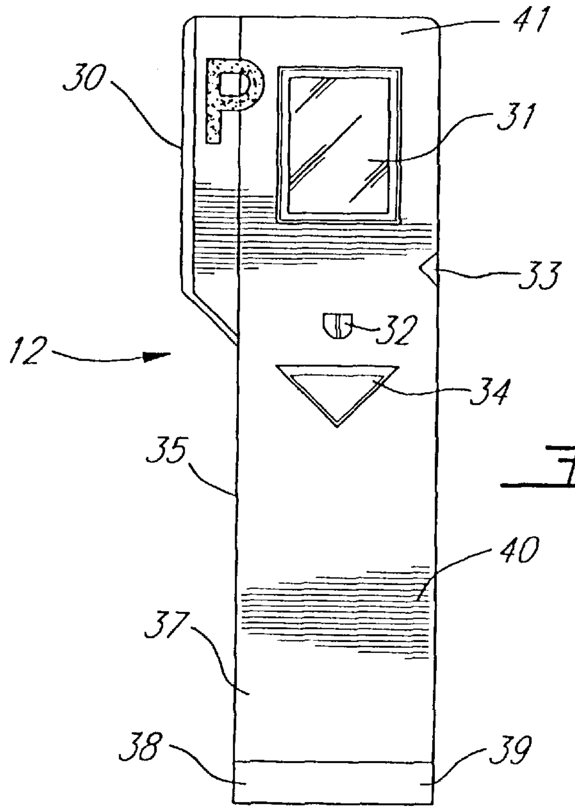
FIG. 3 is a front view of the parking payment terminal according to the preferred embodiment.

With reference to FIG. 3, details of the payment terminal 12 according to the preferred embodiment will now be described. Terminal 12 has a vandalism resistant composite shell housing 40 including an upper access panel 30, a touch screen 31, a coin acceptor slot 32, a smart card acceptor/dispenser slot 33, a coin return/printer output slot 34, and a lower service door 35. Internally, there is provided a coin container 37, an electrical entry 38, and wireless communications electronics 41. The base is equipped with an anchor 39 for securing the terminal 12 to the sidewalk. The access door 35 is key locked, and the escrow box 43 requires a separate key. For additional security, an identity smart card for identifying the service personnel must be inserted into the reader 33' before opening the door 35 otherwise a wireless alarm message is sent. The service personnel will also be required to enter a personal security password. The system may also require authorization from the central computer 16 before access to the escrow coin box is permitted.

Figure 4:
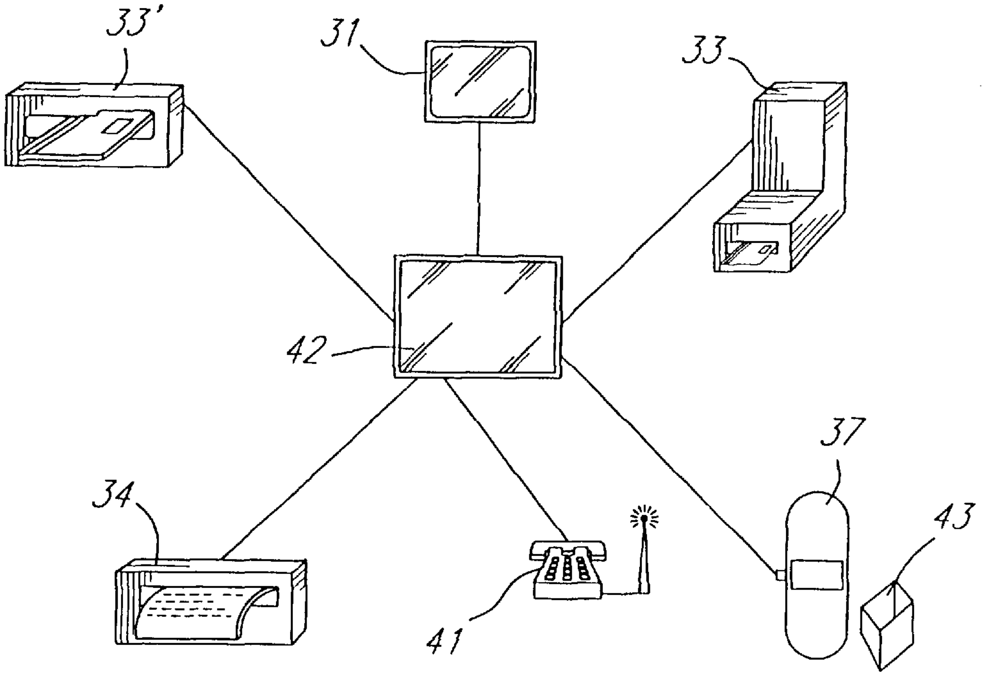
FIG. 4 is a block diagram of the parking payment terminal according to the preferred embodiment.

As illustrated in FIG. 4, the payment terminal 12 has the following basic operating components. A computer controller 42 communicates by data connection to the touch video screen 31, a smart card dispenser 33, a smart card reader 33', a printer 34, a wireless modem 41, and a coin acceptor 37. The coins collected by the acceptor 37 are delivered into a coin escrow unit 43.

As can be appreciated, in the case that a payment terminal works only with smart cards already programmed with license plate data and loaded with funds, a much smaller payment terminal may be provided which could be mounted to a building wall, a lamp post or to a former parking meter post. Such a compact terminal would contain the wireless modem 41, the smart card reader 33' and a much simpler display screen and key pad entry device. Such a terminal could be battery powered and powered up only during use. The only input required from the motorist would be parking time. Of course, if a motorist needed to load more funds onto a card, the full featured payment terminal 12 as illustrated would be used.

Figure 5:
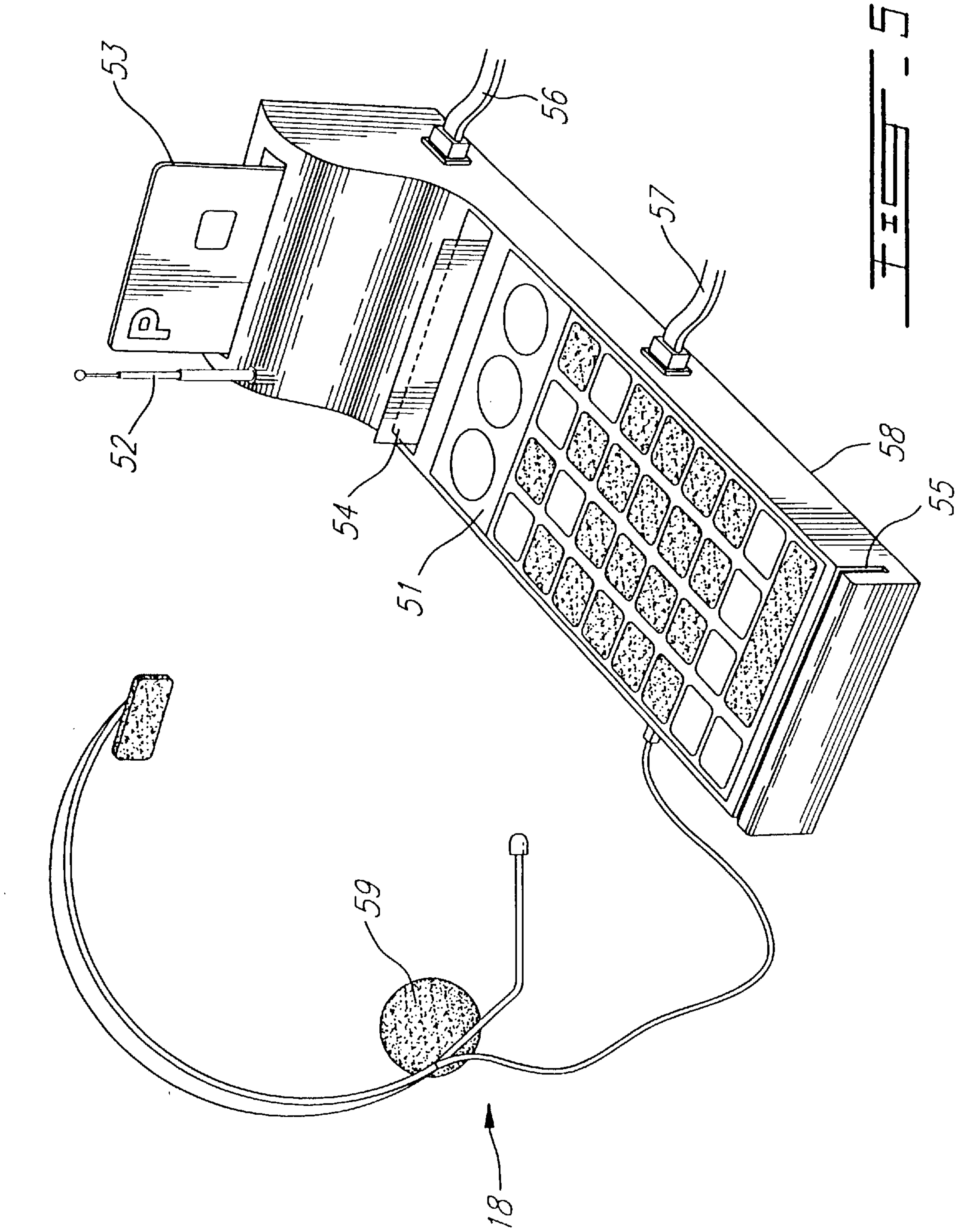
FIG. 5 is a perspective view of the portable terminal according to the preferred embodiment.

As illustrated in FIG. 5, each portable terminal 18 according to the preferred embodiment has an LCD touch sensitive keypad/display 51, a wireless data modem 52, a smart card reader 53, a citation or ticket printer 54, and a magnetic stripe card reader 55. As can be appreciated, the terminal 18 is small, portable and hand held. External input/output devices are also provided, namely an audio headset 59 for receiving voice commands/data and relaying audio signals to the parking warden. A CCD video camera (not shown) may be connected at 56 for taking images of license plates, which can be analyzed to obtain license plate number data by OCR methods in the computer inside the terminal 18. A bar code reader (not shown) may be connected at 57 for reading bar code stickers placed on the inside of windshields. A replaceable, rechargeable battery 58 provides the terminal 18 with sufficient power for operation during a normal inspection run.

For security purposes, the user interface of terminal 18 will only operate in the preferred embodiment when the parking warden inserts a personal identification smart card into the reader 53 and then enters a personal identification code using the key pad 51. If the smart card is removed from the reader during normal use of the terminal 18, the terminal is locked out.

The operation of receiving parking data packets via modem 52 from the public wireless network broadcasts takes place continuously in the background without interruption. In the preferred embodiment, the portable terminals 18 have a computer memory able to store data on all parked vehicles in a jurisdiction or geographical area. The parking warden enter a license plate number, using one of the keypad 51, the microphone on the headset 59 or the camera connected to 56, and the portable terminal return the information available on the vehicle. If no match is found for the vehicle, the closest matches in the database are returned. For each vehicle, the data retrieved and displayed on the LCD screen 51 is that contained in the database, namely the vehicle plate number, the time when parking was purchased, the duration, and the payment terminal used. The warden examines the data and decides whether a citation should be issued. In the case that a citation is issued, the portable terminal is used to prepare the citation by filling in extra data, as would normally be done with a manually prepared citation, such as vehicle location, vehicle color, make, model, and the exact nature of the parking violation. The latter is important since even vehicles having parking paid for may be found in special parking zones where there is a shorter parking limit, or a restriction to commercial vehicles only.

The portable terminal 18 also provides the parking warden with the ability to cancel or correct citations. If a motorist wishes to settle a citation on the spot, the portable terminal is equipped with both a smart card reader 53 and a swipe card reader 55 which may be used to accept funds from the motorist, the financial transaction being preferably immediately processed by wireless communication with the banking institutions via the central computer 16. Whether a parking warden issues a citation, cancels a citation and/or settles a citation, the citation data can be stored for communication from the terminal 18 to the central computer 16 for audit and accounting purposes. If a parking warden issues a citation, and within a short grace period of five minutes or less, the motorist goes to a payment terminal 12 to pay for parking, the citation is automatically canceled, according to the preferred embodiment. This is the case since it is considered plausible that a motorist may be en route to a payment terminal when the parking warden checks the vehicle. In the preferred embodiment, the citation is canceled, although a small surcharge of an extra amount, for example 25 cents, may be applied, especially if the time elapsed is close to the maximum grace period limit. The central computer may also keep a record of such automatically canceled citations and report any vehicle that regularly receives such citations, since this would be a sign of likely abuse by a motorist keeping watch on the vehicle while not having paid for parking.

As can be appreciated, the motorist could be requested to enter parking space identification data instead of vehicle identification data, and spaces could be checked instead of vehicles. In the preferred embodiment, vehicles are checked instead of curbside parking spaces, and vehicles may park anywhere within a curbside parking zone without needing to fit into a predetermined parking space.

The payment terminals in the preferred embodiment dispense and sell the parking smart cards. Storage of vehicle identification data in the cards is optional. The telecommunications system connecting the central computer to the payment terminals may be used to transmit video advertising data for display on the screens of the payment terminals when the terminals are not in use. A schedule for presenting advertising video may be provided for displaying ads at specific times of day or at a specific frequency. The schedules and video data can be updated as desired from the central computer. The payment terminals may print advertising on the receipts given to motorists, or the reverse side of the receipts may contain printed advertising. The central computer may send to the payment terminals parking tariff tables to change parking rates as desired, or to accommodate special events.

Although the invention has been described above with reference to a preferred embodiment, it is to be understood that the above description is intended merely to illustrate the invention and not to limit the scope of the invention as defined in the appended claims.

What is claimed is:

1. An urban parking system comprising:

a wireless network covering a large local geographic area;

a large number of payment terminals provided in said area each located near a plurality of parking spaces, each said payment terminal comprising data collection means for gathering parking data from a motorist, said parking data including at least one of vehicle identification data and parking space identification data;

communication means for transferring said parking data from said data collection means to said wireless network in response to payment being made at said payment terminals;

a plurality of portable terminals for use by parking wardens inspecting said parking spaces of said area, said portable terminals including wireless communication means, a memory for storing said parking data, and a user interface means; and broadcast means associated with said wireless network for transmitting said parking data substantially upon receipt from said communication means simultaneously to said plurality of portable terminals in said area;

wherein said plurality of portable terminals for use by parking wardens inspecting said parking spaces of said area receives said parking data continuously from the broadcast means in the background without interruption.

2. The system according to claim 1, wherein said communication means comprise wireless means communicating directly with said wireless network.

3. The system according to claim 2, wherein said communication means provide a group address designating said portable terminals, whereby said broadcast means respond directly to said communication means.

4. The system according to claim 1, further comprising a central control computer connected to said wireless network, receiving said parking data sent to said portable terminals by said wireless network and receiving citation data from said portable terminals.

5. The system according to claim 4, wherein said control computer has means for canceling a parking citation record relating to a given vehicle if parking is paid at one of said payment terminals for said given vehicle within a predetermined short grace period.

6. The system according to claim 4, further comprising a plurality of docking stations for said portable terminals, wherein said control computer is in wired communication with said docking stations for transferring said parking data to said portable terminals when docked.

7. The system according to claim 4, further comprising a financial institution electronic funds processing gateway connected to said central control computer for handling at least one of debit and credit financial transactions.

8. The system according to claim 4, further comprising a public access gateway connected to said central control computer for providing information to the public on parking data and citation data.

9. The system according to claim 1, wherein said portable terminals comprise a citation printer.

10. The system according to claim 1, wherein said portable terminals comprise a security card reader and means to prevent access to said parking data in absence of a security card placed in said reader.

11. The system according to claim 10, further comprising means for entering and verifying a passcode, wherein access to said parking data is prevented when said passcode is not correctly given.

12. The system according to claim 1, wherein said portable terminals comprise a video camera input and image analysis means for recognizing license plate data from a video camera image.

13. The system according to claim 1, wherein any one of said payment terminals may be used to pay for additional parking time for a given vehicle.

14. A method of communicating vehicle parking data in an urban parking system, the method comprising the steps of:

providing a wireless network covering a large local geographic area;

providing a large number of payment terminals provided in said area each located near a plurality of parking spaces;

gathering parking data from motorists at said payment terminals, said parking data including at least one of vehicle identification data and parking space identification data;

transferring said parking data from said payment terminals to said wireless network in real-time as payment is made at said payment terminals;

providing a plurality of portable terminals for use by parking wardens inspecting said parking spaces of said area; and using said wireless network to transmit said parking data received from each motorist upon receipt from said payment terminals simultaneously to said plurality of portable terminals In said area;

wherein said transferring of said parking data from said payment terminals to said plurality of portable terminals is performed continuously without interruption.

15. An urban parking system for use with a public wireless data network, said system comprising:

a large number of payment terminals provided in a large local geographic area covered by said network and each located near a plurality of parking spaces, each said payment terminal comprising wireless modem means and data collection means for gathering parking data from a motorist, said parking data including at least one of vehicle identification data and parking space identification data, said wireless modem means transferring said parking data from said data collection means to said wireless network substantially as payment is made;

a plurality of portable terminals for use by parking wardens inspecting said parking spaces of said area, said portable terminals including wireless communication means communicating with said public wireless data network, a memory for storing said parking data, and a user interface means; and broadcast means associated with said wireless network for transmitting said parking data upon receipt from said wireless modem means simultaneously to said plurality of portable terminals in said area;

wherein said plurality of portable terminals for use by parking wardens inspecting said parking spaces of said area receives said parking data continuously from the broadcast means in the background without interruption.

* * * * *